United States Patent
Mangiaracina et al.

(10) Patent No.: US 10,651,678 B2
(45) Date of Patent: *May 12, 2020

(54) PROVIDING POWER TO REMOTE EMERGENCY LIGHT FIXTURES

(71) Applicant: Eaton Intelligent Power Limited, Dublin (IE)

(72) Inventors: Anthony Audenzio Mangiaracina, Sharpsburg, GA (US); Daniel Leland Bragg, Peachtree City, GA (US); Westly Davis Hetrick, Atlanta, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,710

(22) Filed: Oct. 15, 2018

(65) Prior Publication Data

US 2019/0190309 A1 Jun. 20, 2019

Related U.S. Application Data

(63) Continuation of application No. 15/140,047, filed on Apr. 27, 2017, now Pat. No. 10,103,568, which is a
(Continued)

(51) Int. Cl.
*H02J 3/02* (2006.01)
*H02J 9/00* (2006.01)
(Continued)

(52) U.S. Cl.
CPC .................... *H02J 9/00* (2013.01); *F21S 8/00* (2013.01); *H02J 7/0068* (2013.01);
(Continued)

(58) Field of Classification Search
CPC ...... H02J 9/00; H02J 7/0068; H05B 37/0245; H05B 37/0272; H05B 37/0263; F21S 8/00
(Continued)

(56) References Cited

U.S. PATENT DOCUMENTS

| | | | |
|---|---|---|---|
| 4,349,863 A | 9/1982 | Peterson | |
| 4,849,682 A * | 7/1989 | Bauer | .................. H02J 7/0004 320/106 |

(Continued)

FOREIGN PATENT DOCUMENTS

| | | |
|---|---|---|
| EP | 2326147 | 5/2011 |
| WO | WO2013132003 | 9/2013 |

OTHER PUBLICATIONS

European Search Report for EP 13778182 dated Jan. 28, 2016.
International Search Report PCT/US2013/037459, dated Aug. 15, 2013.

*Primary Examiner* — Ryan Jager
(74) *Attorney, Agent, or Firm* — King & Spalding LLP (57) ABSTRACT

A remote emergency light system provides a base unit that is electrically coupled to one or more remote emergency light fixtures using cables. The base unit may provide power to each of the remote emergency light fixtures using the cables to activate the remote emergency light fixtures during an emergency condition. Alternatively, the base unit may provide a trickle charge to one or more remote emergency light fixtures when each of the remote emergency light fixtures includes an energy charging device. The base unit may be configured to communicate with the remote emergency light fixtures and determine when a trickle charge should be sent to a remote emergency light fixture, when a trickle charge should be stopped for a remote emergency light fixture, and/or when an energy charging device needs
(Continued)

to be replaced. The cables can meet the requirements for Class 2 circuits as defined by the National Electric Code.

20 Claims, 6 Drawing Sheets

Related U.S. Application Data continuation of application No. 13/465,763, filed on May 7, 2012, now Pat. No. 9,328,883.

(51) Int. Cl.
*F21S 8/00* (2006.01)
*H05B 37/02* (2006.01)
*H02J 7/00* (2006.01)

(52) U.S. Cl.
CPC ..... *H05B 37/0245* (2013.01); *H05B 37/0263* (2013.01); *H05B 37/0272* (2013.01)

(58) Field of Classification Search
USPC .............................................. 315/130; 307/22
See application file for complete search history.

(56) References Cited

U.S. PATENT DOCUMENTS

| | | | | |
|---|---|---|---|---|
| 5,446,440 | A * | 8/1995 | Gleason | G08B 7/062 340/331 |
| 5,633,564 | A * | 5/1997 | Edwards | H02J 9/065 307/46 |
| 6,150,737 | A * | 11/2000 | Nilssen | H02J 3/00 200/297 |
| 6,563,428 | B1 | 5/2003 | Maley, Sr. | |
| 7,466,081 | B2 | 12/2008 | Schweigert | |
| 7,638,948 | B2 * | 12/2009 | Descarries | H05B 37/032 315/129 |
| 7,804,189 | B2 * | 9/2010 | Koehler | H02J 1/08 307/31 |
| 7,839,020 | B2 | 11/2010 | Nakanishi | |
| 8,274,397 | B2 * | 9/2012 | Wilson | B60Q 1/2611 315/312 |
| 8,754,778 | B2 | 6/2014 | Winton | |
| 2007/0054618 | A1 * | 3/2007 | Lewis | H04L 25/02 455/41.2 |
| 2008/0129219 | A1 | 6/2008 | Smith et al. | |
| 2008/0174929 | A1 | 7/2008 | Shen et al. | |
| 2008/0197790 | A1 * | 8/2008 | Mangiaracina | F21S 9/022 315/312 |
| 2008/0276509 | A1 * | 11/2008 | Yu | F21V 23/04 40/570 |
| 2009/0026962 | A1 | 1/2009 | Zilberberg | |
| 2010/0237695 | A1 * | 9/2010 | Covaro | H04B 3/548 307/19 |
| 2010/0327766 | A1 | 12/2010 | Recker et al. | |
| 2011/0104963 | A1 * | 5/2011 | Ellis | B63B 35/71 440/6 |
| 2011/0169650 | A1 * | 7/2011 | Holloway | F16P 3/14 340/653 |
| 2011/0181206 | A1 * | 7/2011 | Liess | H02J 9/065 315/307 |
| 2012/0126700 | A1 * | 5/2012 | Mayfield | H05B 37/0272 315/86 |
| 2012/0181934 | A1 * | 7/2012 | Knibbe | G08B 7/066 315/130 |
| 2012/0245880 | A1 * | 9/2012 | Nabrotzky | G01R 31/086 702/122 |
| 2013/0016500 | A1 * | 1/2013 | Tress | F21V 33/0012 362/133 |
| 2013/0043794 | A1 | 2/2013 | Hartmann et al. | |
| 2013/0127362 | A1 * | 5/2013 | Trainor | H02J 9/065 315/224 |
| 2013/0147376 | A1 | 6/2013 | Trainor et al. | |
| 2013/0293157 | A1 * | 11/2013 | Shea | H05B 37/0254 315/312 |
| 2014/0129164 | A1 * | 5/2014 | Gorbold | G01R 31/3835 702/63 |
| 2014/0300282 | A1 | 10/2014 | Grave et al. | |

* cited by examiner

PROVIDING POWER TO REMOTE EMERGENCY LIGHT FIXTURES

RELATED APPLICATION

This application is a continuation application of and claims priority under 35 U.S.C. § 120 to U.S. patent application Ser. No. 15/140,047, titled "Providing Power To Remote Emergency Light Fixtures" and filed on Apr. 27, 2016, which is a continuation application of U.S. patent application Ser. No. 13/465,763, titled "Providing Power To Remote Emergency Light Fixtures" and filed on May 7, 2012. The entire contents of the aforementioned applications are hereby incorporated herein by reference.

TECHNICAL FIELD

The present disclosure relates generally to remote emergency light fixtures, and more particularly to the interaction between a base unit and one or more remote emergency light fixtures that are electrically coupled to the base unit.

BACKGROUND

Emergency lighting is a requirement in a number of applications. Emergency lighting is designed to activate in an emergency situation (e.g., power failure) to provide egress lighting during the emergency situation. The emergency lighting must not only be installed according to certain codes and regulations, but the emergency lighting must also function properly when called upon. Often, activating the emergency is an automatic process that occurs when the emergency situation arises.

At times, the emergency lighting is part of a system. For example, a base unit may be used to activate one or more remote emergency lighting devices. When the emergency situation arises, the base unit detects the emergency situation and activates the remote emergency lighting devices in the system. The footprint of the base unit is relatively large compared to the footprint of a remote emergency lighting devices.

SUMMARY

For one exemplary aspect, a system for providing emergency egress lighting can include a base unit that is electrically coupled to an AC power source and that can be configured to receive power form the AC power source and supply power to at least one emergency light fixture. The system can also include an emergency light electrically coupled to the base unit and positioned in an area remote from the base unit. The emergency light fixture can be configured to receive the power from the base unit. The system can also include a cable that has a first end that is electrically coupled to the base unit and a second distal end that is electrically coupled to the emergency light fixture.

In yet another exemplary aspect, a method for delivering power to a plurality of emergency light fixtures can include the step of providing a base unit that is electrically coupled to a source of AC power. The base unit can be electrically coupled to a least one of the plurality of emergency light fixture using a cable. Power can be transmitted to at least one of the plurality of emergency light fixtures from the base unit through the cable.

In still another exemplary aspect, a system for providing power to emergency egress lighting can include a base unit electrically coupled to a power source, the base unit configured to receive power from the power source and supply a trickle charge to at least one emergency light fixture. The system can also include an emergency light fixture electrically coupled to the base unit and positioned in an area remote from the base unit, the emergency light fixture configured to receive the trickle charge from the base unit. The system can further include a cable having a first end electrically coupled to the base unit and a second distal end electrically coupled to the emergency light fixture.

These and other aspects, objects, features, and embodiments will be apparent from the following description and the appended claims.

BRIEF DESCRIPTION OF THE DRAWINGS

The drawings illustrate only exemplary embodiments of providing power to remote emergency light fixtures and are therefore not to be considered limiting of its scope, as providing power to remote emergency light fixtures may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION OF EXEMPLARY EMBODIMENTS

Exemplary embodiments of providing power to remote emergency light fixtures will now be described in detail with reference to the accompanying figures. Like, but not necessarily the same, elements in the various figures are denoted by like reference numerals for consistency. In the following detailed description of the exemplary embodiments, numerous specific details are set forth in order to provide a more thorough understanding of the disclosure herein. However, it will be apparent to one of ordinary skill in the art that the exemplary embodiments herein may be practiced without these specific details. In other instances, well-known features have not been described in detail to avoid unnecessarily complicating the description.

In one or more exemplary embodiments, each base unit and each of the remote emergency light fixtures meets one or more of a number of standards, codes, regulations, and/or other requirements established and maintained by one or more entities. Examples of such entities include, but are not limited to, Underwriters' Laboratories, the Institute of Electrical and Electronics Engineers, and the National Fire Protection Association. For example, wiring (the wire itself and/or the installation of such wire) that electrically couples a base unit with a remote emergency light fixture may fall within one or more standards set forth in the National Electric Code (NEC). Specifically, Article 725 of the NEC defines Class 1 circuits and Class 2 circuits.

Class 1 circuits under Article 725 of the NEC typically operate between 120 V alternating current (AC) and 600 VAC. The wiring used for Class 1 circuits under Article 725 of the NEC must be run in raceways, conduit, and enclosures for splices and terminations. Consequently, wiring for Class 1 circuits must be installed by a licensed electrical professional.

By contrast, Class 2 circuits, under Article 725 of the NEC typically operate at lower power levels (e.g., up to 100 VA, no more than 30 VAC). The wiring used for Class 2 circuits under Article 725 of the NEC does not need to be run in raceways, conduit, and/or enclosures for splices and terminations. Consequently, wiring for Class 2 circuits does not need to be installed by a licensed electrical professional.

In addition, each base unit and each of the remote emergency light fixtures are operate during an emergency condition in certain exemplary embodiments. An emergency condition may be any time when auxiliary lighting (e.g., emergency egress lighting) is needed to help bring people to safety. Examples of such an emergency condition may include, but are not limited to, a fire, a tornado, a power outage (when a main source of power has failed), a chemical spill, and a gas leak. A normal condition is when there is no emergency condition.

Figure 1:
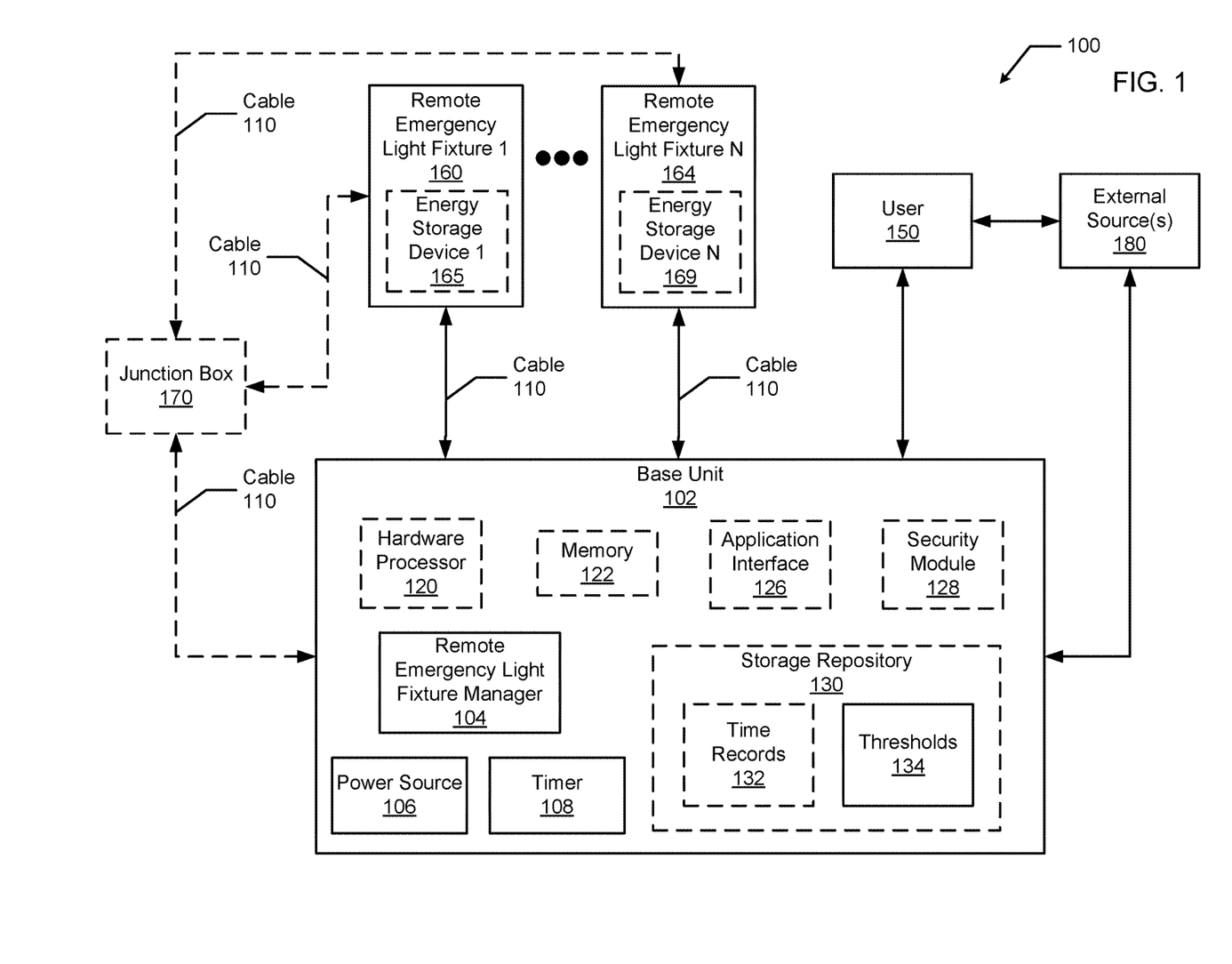
FIG. 1 is a system diagram presenting an exemplary system for use in providing power to remote emergency light fixtures in accordance with one or more exemplary embodiments.

FIG. 1 is a system diagram presenting an exemplary system 100 for use in providing power to remote emergency light fixtures in accordance with one or more exemplary embodiments. Referring now to FIG. 1, the exemplary system 100 includes a base unit 102, cable 110, one or more remote emergency light fixtures (e.g., remote emergency light fixture 1 160 . . . remote emergency light fixture N 164), a user 150, one or more external sources 180, and, optionally, a junction box 170. In certain exemplary embodiments, the base unit 102 includes a remote emergency light fixture manager 104, a power source 106, and one or more thresholds 134. The base unit 102 may also optionally include one or more other components, including, but not limited to, a timer 108, a hardware processor 120, memory 122, an application interface 126, a security module 128, and a storage repository 130 that includes time records 132. Each of the remote emergency light fixtures (e.g., remote emergency light fixture 1 160 . . . remote emergency light fixture N 164) may include an energy storage device 165-169. Examples for each of these components is described below. Exemplary embodiments are not limited to the configuration shown in FIG. 1 and discussed herein. For example, the system 100 may have more than one base unit 102, each coupled to one or more distinct remote emergency light fixtures.

The exemplary base unit 102 provides power and/or control signals to each of the remote emergency light fixtures (e.g., remote emergency light fixture 1 160 . . . remote emergency light fixture N 164). The base unit 102 may provide the power (which may include a trickle charge) and/or control signals to each of the remote emergency light fixtures using a direct wired connection, and/or an indirect wired connection (as through the optional junction box 170). In certain exemplary embodiments, the cable 110 is used to electrically couple the base unit 102 to one or more of the remote emergency light fixtures.

In one or more exemplary embodiments, the cable 110 meets the requirements of a Class 2 circuit under Article 725 of the NEC. Alternatively, or in addition, the cable 110 can meet the requirements of a Class 1 circuit under Article 725 of the NEC. The cable 110 may include one or more of a number of different types of wires and/or cables. Examples of the cable 110 that meets the requirements of a Class 2 circuit include, but are not limited to, an Ethernet cable, telephone wire, instrumentation wiring, and mini universal serial bus (USB) cable.

Further, when the cable 110 is used, a hardwire connection is made to one or more of the base unit 102, a remote emergency light fixture, and the optional junction box 170. One or more of a number of connecting devices may be used to create the hardwire connection. Examples of such connecting devices may include, but are not limited to, a RJ45 connector, a RJ11 connector, a RS232 connector, a RS485 connector, and a terminal block.

Other types of wires, cables, and/or wireless technology may be used in conjunction with the cable 110 to couple the base unit 102 to each remote emergency light fixture. In addition, the base unit 102 may be communicably coupled to the user 150 and electrically coupled to a user system (not shown) and the one or more external sources 180 using one or more of any type of cable and/or wireless technology, including but not limited to the cable 110.

The exemplary remote emergency light fixture (e.g., remote emergency light fixture 1 160 . . . remote emergency light fixture N 164) is any type of light fixture (e.g., an exit sign, an egress light, a spotlight, an overhead light) that is activated or is designed to remain activated during an emergency condition. Some exemplary remote emergency light fixtures 160-164 (e.g., an exit sign) can also operating during a normal condition. In certain exemplary embodiments, each remote emergency light fixture 160-164 is remote because it is positioned in a location separate from the base unit 102. For example, a remote emergency light fixture may be positioned one hundred feet away from the base unit 102. The base unit 102 may also include an emergency light fixture.

Each remote emergency light fixture 160-164 and the base unit 102 may comply with one or more standards, regulations, and/or other requirements to be used in particular areas as a remote emergency light fixture. A remote emergency light fixture typically includes an emergency light source that illuminates during the emergency condition to provide emergency egress lighting. In certain exemplary embodiments, the emergency light source may be any type of light source, including but not limited to light emitting diode (LED), halogen, and metal halide.

Each exemplary remote emergency light fixture communicates with the base unit 102 using cable 110. Alternatively, each remote emergency light fixture communicates with the base unit 102 using one or more other types of wires and/or wireless technology. The positioning of the remote emergency light fixtures relative to the base unit 102 may depend on one or more of a number of factors, including, but not limited to, losses in the wires used, the wireless technology being used, or one or more standards directed to emergency lighting.

The exemplary remote emergency light fixtures 160-164 include an energy storage device 165-169. In certain exemplary embodiments, the energy storage device 165-169 is electrically coupled, such as by way of one or more cables 110, to the power source 106 of the base unit 102. Each energy storage device 165-169 stores power or other energy that can be used to illuminate (activate) the light of the remote emergency light fixture 160-164. Examples of an energy storage device include, but are not limited to, a battery (e.g., fixed, rechargeable, nickel cadmium, lithium, nickel metal hydride), a super capacitor, a fuel cell, a flywheel, and/or any other suitable device capable of storing some amount of energy.

The energy storage device 165-169 may be fixedly or removably coupled to the remote emergency light fixture 160-164. When the energy storage device 165-169 is removably coupled to a remote emergency light fixture 160-164, the energy storage device 165-169 may be replaced. The energy storage device 165-169 may be positioned inside of, adjacent to, or outside of one of the remote emergency light fixtures 160-164. In certain exemplary embodiments, the energy storage device 165-169 is coupled to one or more remote emergency light fixtures 160-164 using any type of wired (including the cable 110) and/or wireless technology and may output power to one or more remote emergency light fixtures 160-164. In certain exemplary embodiments, the energy storage device 165-169 may be activated (i.e., instructed to release its charge to its corresponding remote emergency light fixture), directly or indirectly, by a signal (e.g., activation signal) sent by the base unit 102.

As discussed above, each remote emergency light fixture 160-164 is electrically coupled directly or indirectly to the base unit 102 using, at least, the cable 110. When one or more of the remote emergency light fixtures 160-164 is indirectly coupled to the base unit 102, a junction box 170 may be used. The junction box 170 may be any device and/or enclosure that electrically couples different segments of a cable 110 or other types of electrical wire connections, where, for example, one cable 110 electrically couples the base unit 102 to the junction box 170, and another cable 110 electrically couples the junction box 170 to a remote emergency light fixture 160-164. The exemplary junction box 170 electrically couples each segment of the cable 110 using one or more of the hardwire connecting devices described above. In addition, or in the alternative, the junction box 170 may be used to electrically couple other types of cable and/or wire.

In certain exemplary embodiments, the power source 106 of the base unit 102 is one or more sources of energy (e.g., electricity) used to provide power and/or control to the base unit 102 and/or the remote emergency light fixtures 160-164. The power source 106 typically provides electricity that is in AC format and/or direct current (DC) format. The power source 106 may be physically separate from the base unit 102 (as with a 24 VDC remote emergency power source that is connected to the base unit 102 and/or with 120 VAC household wiring that is connected to the base unit 102) and/or internal within the base unit 102 (such as, with a battery).

In certain exemplary embodiments, the power source 106 provides power (e.g., activation power, a trickle charge) and/or a signal (e.g., an activation signal) to one or more of the remote emergency light fixtures 160-164 when an emergency condition (e.g., the main source of power has failed) arises. In addition, or in the alternative, the power source 106 provides power to one or more components (e.g., the remote emergency light fixture manager 104, the timer 108, a light) of the base unit 102. In certain exemplary embodiments, the amount of voltage generated and/or delivered by the power source 106 is any amount suitable to activate the one or more remote emergency light fixtures and/or operate one or more components (e.g., the remote emergency light fixture manager 104) of the base unit 102. In certain exemplary embodiments, the voltage delivered by the power source 106 is transformed, rectified, inverted, and/or otherwise manipulated, at the power source 106 and/or within the base unit 102, so that the various components of the base unit 102 and/or one or more of the remote emergency light fixtures 160-164 receive a proper voltage level to operate properly.

In one exemplary embodiment, a trickle charge is a continuous or periodic amount of power delivered by the power source 106 to the remote emergency light fixtures 160-164. The trickle charge charges the energy storage devices 165-169 of the remote emergency light fixtures 160-164. The amount of power in a trickle charge is a lower amount relative to constant power provided to a remote emergency light fixture 160-164 without an energy storage device 165-169. Put another way, the trickle charge is used to maintain an existing charge of the energy storage devices 165-169, which requires fewer resources (less energy) than fully powering the remote emergency light fixtures 160-164. Consequently, the base unit 102 may provide power and/or control to a larger number of remote emergency light fixtures 160-164 using exemplary embodiments described herein.

The amount of trickle charge may vary. For example, the trickle charge may be a few milliamps, regardless of the rated voltage. As another example, the trickle charge may be 2 A at a rated voltage of 48 V. As yet another example, the trickle charge may be 9.6 A at a rated voltage of 24V. In certain exemplary embodiments, the amount of trickle charge may be less than the maximum allowed under UL Class 2 requirements.

In certain exemplary embodiments, when a trickle charge is provided by the power source 106 to one or more remote emergency light fixtures 160-164, the trickle charge is provided during normal operating conditions (e.g., when the one or more remote emergency light fixtures 160-164 are not activated) and/or during an emergency condition. The amount of trickle charge delivered by the power source 106 to an energy storage device 165-169 is typically determined by one or more of a number of factors, including, but not limited to, the configuration and number of remote emergency light fixtures 160-164, the type of wiring used, the distance between the base unit 102 and the remote emergency light fixtures 160-164, and the capacity of the energy storage devices 165-169. In certain exemplary embodiments, the trickle charge is provided as DC power (e.g., 48 VDC, 200 mA), while in other examples it is provided as AC power.

In one exemplary embodiments, the remote emergency light fixture manager 104 (sometimes called the "manager 104") identifies an emergency condition in which one or more remote emergency light fixtures 160-164 must be activated. Specifically, the remote emergency light fixture manager 104 may identify, directly or indirectly, one or more indications that an emergency condition exists. In certain exemplary embodiments, the remote emergency light fixture manager 104 identifies an emergency condition by communicating with one or more external sources 180. For example, the manager 104 can monitor a main source of power and determine when the main source of power has failed. As another example, the manager 104 can communicate with a fire detection system and receive a signal from the fire protection system when a fire has been detected. As discussed above, other emergency conditions may include, but are not limited to, smoke, a chemical spill, and a gas leak.

Examples of an external source 180 include a sensor, device, or other suitable component that monitors, directly or indirectly, for an emergency condition. The exemplary external source 180 is communicably coupled to and communicates with (e.g., send signals to, receive signals from) the remote emergency light fixture manager 104 using wired (including the cable 110) and/or wireless technology. Specific examples of an external source 180 include, but are not limited to, a smoke detector, a fire alarm, a carbon monoxide detector, a radiation detector, and a protective relay.

In certain exemplary embodiments, the base unit 102 controls the operation and activation of the remote emergency light fixtures 160-164. In one example, the remote emergency light fixture manager 104 instructs the power source 106 to send power (for example, as during an emergency condition and/or to charge an energy storage device) and/or stop sending power (for example, as when an emergency condition no longer exists and/or when an energy storage device is fully charged) to one or more of the remote emergency light fixtures 160-164. If the remote emergency light fixture 160-164 is an exit light or some other lighting device that operates during both a normal condition and an emergency condition, the base unit 102 can provide, in addition to a trickle charge to the corresponding energy storage device 165-169, an operating charge to the remote emergency light fixture 160-164 during a normal condition.

The remote emergency light fixture manager 104 may use the occurrence of an emergency condition, received from one or more external sources 180, to control the one or more remote emergency light fixtures 160-164. For example, when the remote emergency light fixture manager 104 receives a signal (e.g., an outage signal) from one or more external sources 180 indicating that a main power source to a facility at which the base unit is located has failed, the remote emergency light fixture manager 104 may send power (e.g., a trickling charge) and/or an activation signal to one or more of the remote emergency light fixtures 160-164. In such a case, the one or more of the remote emergency light fixtures 160-164 activate (i.e., the lighting of the remote emergency light fixture 160-164 is turned on) upon receiving the activation signal.

In cases where a remote emergency light fixture 160-164 does not include an energy storage device, the remote emergency light fixture manager 104 sends energy, using the power source 106, to the remote emergency light fixture 160-164. In cases where a remote emergency light fixture 160-164 includes an energy storage device, the remote emergency light fixture manager 104 sends a trickle charge, using the power source 106, to charge one or more energy storage devices 165-169. The trickle charge sent by the remote emergency light fixture manager 104 to the one or more energy storage devices 165-169 may be constant or intermittent. When the trickle charge is intermittent, the intermittency may be based on one or more of a number of factors, including but not limited to a predetermined and preset period of time between the sending of trickle charges and the occurrence of some event (e.g., passage of time, the energy level of an energy storage device 165-169).

In certain exemplary embodiments, the remote emergency light fixture manager 104 also adjusts (start, stop, increase, decrease) a trickle charge to one or more remote emergency light fixtures 160-164 at various times and/or in various amounts. The remote emergency light fixture manager 104 may send and/or stop a trickle charge to one or more particular remote emergency light fixtures 160-164 or to all remote emergency light fixtures that are electrically and or communicably coupled to the base unit 102.

In exemplary embodiments where the remote emergency light fixtures 160-164 include an energy storage device 165-169, the power source 106 of the base unit 102 may be substantially smaller in size when compared to base units currently known in the art. As a result, the profile of the base unit 102, particularly when the remote emergency light fixtures 160-164 include an energy storage device 165-169, is substantially small compared to currently known base units. In addition, the number of remote emergency light fixtures 160-164 that are electrically and/or communicably coupled to and controlled by the base unit 102 may be higher than those in currently known remote emergency light systems because supplying a trickle charge during normal operation to each of the remote emergency light fixtures 160-164 greatly reduces the demand on the base unit 102 during an emergency condition.

In certain exemplary embodiments, the remote emergency light fixture manager 104 receives information (e.g., an energy level) from one or more of the remote emergency light fixtures 160-164 to trigger a change in the delivery of trickle charge to the one or more remote emergency light fixtures 160-164. For example, when the remote emergency light fixture manager 104 is not sending a trickle charge to remote emergency light fixture 1 160, the remote emergency light fixture manager 104 may receive a signal from remote emergency light fixture 1 160, where the signal discloses that the energy level of its energy storage device 165 is less than a low energy level threshold. Alternatively, the remote emergency light fixture manager 104 receives a signal and compares the energy level of the energy storage device 165 with a low energy level threshold. The remote emergency light fixture manager 104 determines if the energy level of the energy storage device is less than the low energy level threshold.) If the manager 104 determines that the energy level of the energy storage device 165 is below or at or below the threshold, the remote emergency light fixture manager 104 sends a trickle charge to energy storage device 1 165.

As another example, when the remote emergency light fixture manager 104 is sending a trickle charge to energy storage device 165 of the remote emergency light fixture 1 160, the manager 104 may receive a different signal from the remote emergency light fixture 1 160, where the different signal discloses that the energy level of its energy storage device 165 exceeds an upper energy level threshold. In such a case, the manager 104 terminates the trickle charge to energy storage device 1 165. In these two examples, the upper energy level threshold is greater than the low energy level threshold.

The upper energy level threshold and the low energy level threshold may be may be different for each energy storage device 165-169. For each energy storage device 165-169, the upper energy level threshold and the low energy level threshold may be determined based on one or more of a number of factors, including but not limited to the capacity of the energy storage device, the type of energy storage device, the distance and/or type of the cable 110 connecting the remote emergency light fixture 160-164 to the base unit 102, the environment (e.g., temperature, humidity) in which the energy storage device is positioned, the history of replacing the energy storage device, and the historical charging times for the energy storage device. Each upper energy level threshold and low energy level threshold may be created and/or updated by the user 150, by default, and/or by the remote emergency light fixture manager 104.

In certain exemplary embodiments, the remote emergency light fixture manager 104 retrieves one or more thresholds 134 from and/or stores one or more thresholds 134 in the storage repository 130. A threshold 134 may be a limit that, once reached, triggers an action. A threshold 134 may be used to determine when a trickling charge should be delivered to an energy storage device 165-169. Examples of a threshold 134 may include, but are not limited to, an upper energy level threshold, a low energy level threshold, and a time threshold.

Optionally, the manager 104 may also retrieve one or more time records 132 from and/or store one or more time records 132 in the storage repository 130. In certain exemplary embodiments, a time record 132 is an amount of time that is captured by the timer 108. A time record 132 may be used, for example, to designate an amount of time between trickle charges for a energy storage device. A number of time records 132 for each energy storage device 165-169 may be maintained in the storage repository 130 to track the performance of the energy storage device.

The exemplary manager 104 also determines whether an energy storage device 165-169 is failing. This determination may be based on comparing one or more parameters with one or more corresponding thresholds. For example, if the amount of time (as measured by the timer 108 and, in certain exemplary embodiments, stored as a time record 132 in the storage repository 130) between trickle charges (measured, for example, from receiving a previous fully-charged signal to the current fully-charged signal and/or from receiving a previous low charge signal to the current low charge signal) to a remote emergency light fixture 160-164 is less than a time threshold, the manager 104 may determine that the energy storage device 165-169 needs to be replaced. In such a case, the manager 104 may send a notification (for example, to the user 150) to indicate that the energy storage device 165-169 needs to be replaced. Multiple notifications may be sent, with each notification corresponding to a different time threshold. For example, a lower time threshold may correspond to an urgent notification, while a higher time threshold may correspond to an informational notification.

In certain exemplary embodiments, the time threshold is not the same for each energy storage device 165-169. For each energy storage device 165-169, the time threshold may be determined based on one or more of a number of factors, including but not limited to the capacity of the energy storage device 165-169, the type of energy storage device 165-169, the distance and/or type of the cable 110 connecting the remote emergency light device 160-164 to the base unit 102, the environment (e.g., temperature, humidity) in which the energy storage device 165-169 is positioned, the history of replacing the energy storage device 165-169, and the historical charging times for the energy storage device 165-169. Each time threshold may be created and/or updated by the user 150, by default, and/or by the manager 104.

In one exemplary embodiment, a timer 108 is positioned within the base unit 102 and keeps clock time and/or tracks one or more periods of time (e.g., tracking a fixed period of time, tracking a time between events) as a time record 132. The exemplary timer 108 is communicably coupled to the manager 104 and is configured to track one or more time periods concurrently and communicates times to, as well as receive instructions to start tracking a time period from, the manager 104. For example, the timer 108 notifies the manager 104 when a certain amount of time (e.g., the time between sending a trickle charge and terminating the trickle charge) has lapsed.

In certain exemplary embodiments, the base unit 102 communicates with one or more remote emergency light fixtures 160-164, one or more external sources 180, and/or the user 150. One or more of a number of components (e.g., remote emergency light fixture manager 104, the hardware processor 120, memory 122, the storage repository 130) of the base unit 102 are used to perform the various functions of the base unit 102. Such components may be discrete components, part of a semiconductor, part of an integrated circuit, part of a microcontroller, and/or part of a software-based control circuit.

In one exemplary embodiment, the base unit 102 is implemented according to a client-server topology. In this example, the base unit 102 corresponds to enterprise software running on one or more servers, and in some embodiments may be implemented as a peer-to-peer system, or resident upon a single computing system. In additional exemplary embodiments, the base unit 102 is accessible from other machines using one or more application programming interfaces and/or user interfaces (not shown). In one or more exemplary embodiments, the base unit 102 is accessible over a network connection (not shown), such as the Internet, by one or more users (e.g., user 150, external source 180, remote emergency light fixture 160-164). Further, information and/or instructions received and/or generated by the base unit 102 may also be stored and accessed over the network connection.

Alternatively or additionally, in certain exemplary embodiments, the base unit 102 is a local computer system of the user 150. In such embodiments, the base unit 102 may, optionally, not be implemented using a client-server topology. For example, the base unit 102 may correspond to a portable computer, mobile device, another type of computing device, and/or combination of multiple computing devices. Additionally or alternatively, the base unit 102 may be a distributed computer system and/or multi-processor computer system that includes multiple distinct computing devices.

In certain exemplary embodiments, the base unit 102 is electrically and/or communicably coupled to one or more remote emergency light fixtures 160-164 using, at least, cable 110. The remote emergency light fixture 160-164 coupled to the base unit 102 may be detachable and/or portable. In certain exemplary embodiments, the base unit 102 includes one or more components (e.g., transceiver) for receiving and sending signals wirelessly.

The user 150 interacts with the base unit 102, for example, by sending settings to and receiving information (e.g., a notification) from the base unit 102. The user 150 is capable of interacting with the base unit 102 using one or more of a number of devices, including, but not limited to, a finger (for example, to manually adjust a setting on a dial located in the base unit 102), a stylus, a cursor of a mouse, and a key on a keypad. The user 150 is capable of interacting with the base unit 102 in person (e.g., physically touching a portion of the base unit 102) or virtually (e.g., executing a command using software). The user 150 may be a plant manager, a foreman, a manufacturer, a vendor of a remote emergency light system, a safety professional, a fire marshall, a business owner, a tenant, a landlord, an agent, an administrator, an energy manager, a consultant, a representative of the owner, or some other entity that manages and/or works in an area that has remote emergency lighting devices coupled to the base unit 102.

In one exemplary embodiment, the user 150, one or more remote emergency light fixtures 160-164, and/or one or more external sources 180 use a system that operates using software. The exemplary system is, or may contain a form of, an Internet-based or an intranet-based computer system that is capable of communicating with the software. The system may include any type of computing device and/or communication device, including but not limited to the base unit 102. Examples of the system include, but are not limited to, a laptop computer with Internet or intranet access, a smart phone, a server, a server farm, and a personal digital assistant (PDA). In certain exemplary embodiments, the system corresponds to a computer system as described below with regard to FIG. 4.

The software may execute instructions on the base unit 102 and/or a separate device (e.g., a server, mainframe, desktop personal computer (PC), laptop, personal desktop assistant (PDA), television, cable box, satellite box, kiosk, telephone, mobile phone, or other computing devices) from the base unit 102. In certain exemplary embodiments, the device on which the software executes is communicably coupled by a network (e.g., Internet, intranet, extranet, Local Area Network (LAN), Wide Area Network (WAN), or other network communication methods), with wired and/or wireless segments. The software may also be part of, or operate separately from but in conjunction with, the base unit 102.

Continuing with reference to FIG. 1, the exemplary base unit 102 retrieves and stores information, instructions, thresholds, input, recorded amounts of time, and/or any other interaction received from a remote emergency light fixture 160-164, an external source 180, and/or the user 150. More specifically, the base unit 102 uses the application interface 126 to retrieve and store information, measurements, instructions, settings, input, and/or any other interaction received from the user 150, one or more external sources 180, and/or one or more remote emergency light fixtures 160-164 in the storage repository 130, in accordance with one or more exemplary embodiments.

The exemplary storage repository 130 is a persistent storage device (or set of devices) that stores software and data used to control one or more remote emergency light fixtures. The storage repository 130 may store any type of suitable data associated with the remote emergency light fixtures 160-164, including but not limited to thresholds and time records relative to charging one or more energy storage devices 165-169. Examples of a storage repository 130 include, but are not limited to, a database (or a number of databases), a file system, a hard drive, some other form of data storage, or any suitable combination thereof. The storage repository 130 may be located on multiple physical machines, each storing all or a portion of the information, measurements, calculations, instructions, selections, input, and/or any other interaction. Each storage unit or device may be physically located in the same or different geographic location, which may be within or outside of the base unit 102.

Optionally, an exemplary hardware processor 120 within the base unit 102 is configured to execute software in accordance with one or more exemplary embodiments. Specifically, the hardware processor 120 is configured to execute the instructions used to operate the base unit 102, including any of its components, described above and shown in FIG. 1, as well as software used by the user 150, the one or more external sources 180, and/or the one or more remote emergency light fixtures. The exemplary hardware processor 120 is an integrated circuit, a central processing unit, a multi-core processing chip, a multi-chip module including multiple multi-core processing chips, or other hardware processor. The hardware processor 120 may be known by other names, including but not limited to a computer processor, a microprocessor, and a multi-core processor.

In one or more exemplary embodiments, the hardware processor 120 is configured to execute software instructions stored in optional memory 122. The exemplary memory 122 may include one or more cache memories, main memory, and/or any other suitable type of memory. In certain exemplary embodiments, the memory 122 is discretely located within the base unit 102 relative to the hardware processor 120. In certain configurations, the memory 122 may also be integrated with the hardware processor 120.

Optionally, in one or more exemplary embodiments, the security module 128 is configured to secure interactions between the base unit 102 and the user 150, the external sources 180, and/or the remote emergency light fixtures. More specifically, the exemplary security module 128 is configured to authenticate communication from software based on security keys verifying the identity of the source of the communication. For example, software may be associated with a security key enabling the user 150 to interact with the base unit 102. Further, the security module 128 may be configured to restrict interactions, remote emergency light fixtures that can be accessed and/or controlled, and/or transmission of information (e.g., outage signal), as well as access to other information.

Figure 2:
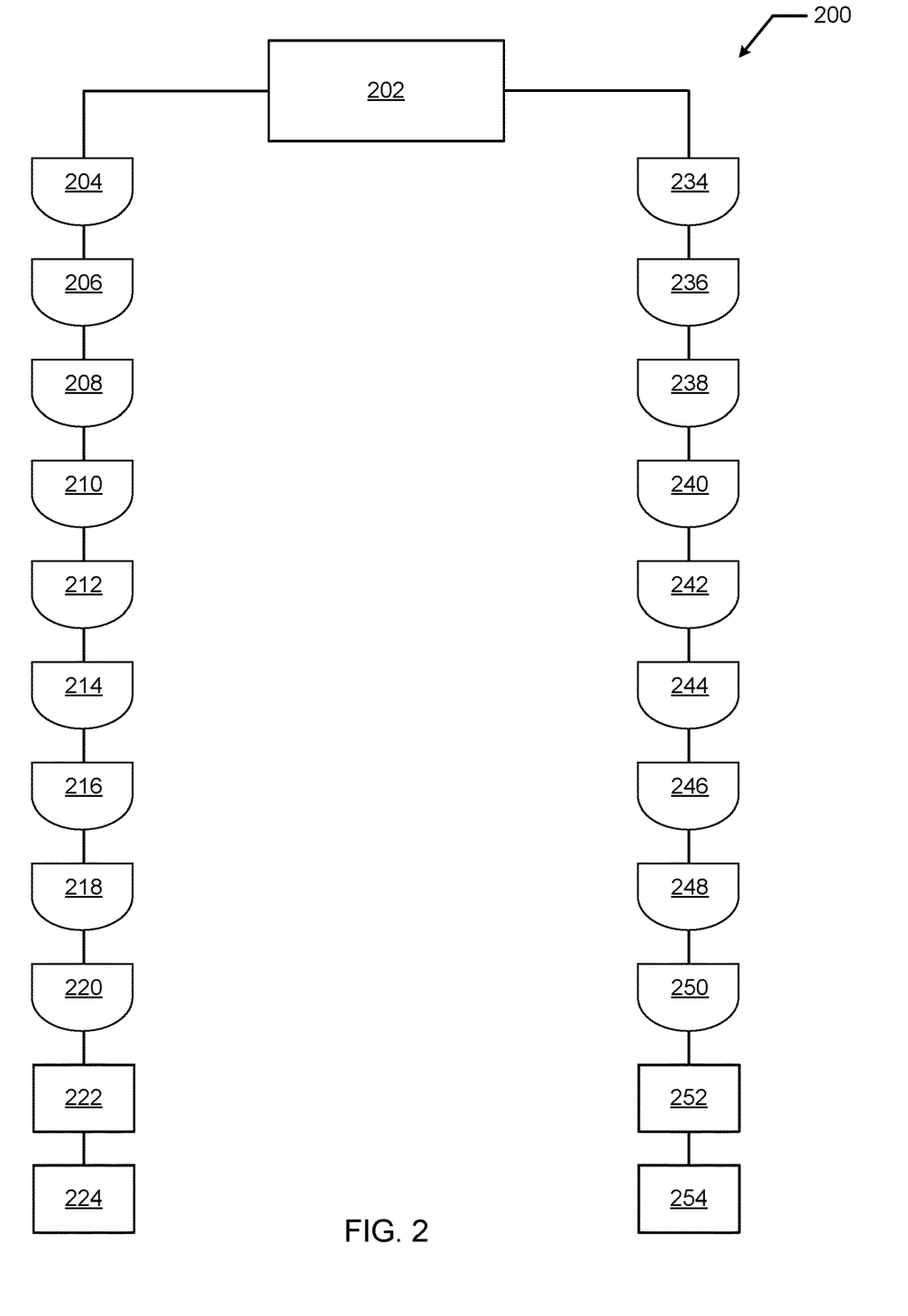
FIG. 2 shows an exemplary system having multiple remote emergency light fixtures in accordance with one or more alternative exemplary embodiments.

FIG. 2 is an exemplary system 200 having multiple remote emergency light fixtures in accordance with one or more alternative exemplary embodiments. In this example, each of the remote emergency light fixtures includes an energy storage device. Also, each component shown in FIG. 2 is electrically coupled using class 2 cable 250. In certain exemplary embodiments, the cable 250 is some cable type (e.g., class 1) other than class 2.

Referring to FIG. 2, the base unit 202 is directly electrically coupled to two remote emergency light fixtures (i.e., remote emergency light fixture 204 and remote emergency light fixture 234). Connected in series to remote emergency light fixture 204, forming an array 203 of remote emergency light fixtures, are remote emergency light fixture 206, remote emergency light fixture 208, remote emergency light fixture 210, remote emergency light fixture 212, remote emergency light fixture 214, remote emergency light fixture 216, remote emergency light fixture 218, remote emergency light fixture 220, remote emergency light fixture 222, and remote emergency light fixture 224. In this example, all remote emergency light fixtures in the aforementioned array of series-connected remote emergency light fixtures are emergency egress lights except for remote emergency light fixture 222 and remote emergency light fixture 224, which are exit signs.

The base unit 202 provides a trickle charge to the array 203 of remote emergency light fixtures, beginning with remote emergency light fixture 204, to keep the energy storage devices, if any, inside of each remote emergency light fixture in the array 203 at or near a fully-charged state. As a result, when an emergency condition arises, the base unit 202 merely provides an activation signal to each remote emergency light fixture in the array. In other words, because the energy storage devices are already fully-charged, the remote emergency light fixtures do not require additional power from the base unit 202 to active and operate.

Referring again to FIG. 2, connected in series to remote emergency light fixture 234, forming a different array 233 of remote emergency light fixtures, are remote emergency light fixture 236, remote emergency light fixture 238, remote emergency light fixture 240, remote emergency light fixture 242, remote emergency light fixture 244, remote emergency light fixture 246, remote emergency light fixture 248, remote emergency light fixture 250, remote emergency light fixture 252, and remote emergency light fixture 254. In this example, all remote emergency light fixtures in the aforementioned array of series-connected remote emergency light fixtures are emergency egress lights except for remote emergency light fixture 252 and remote emergency light fixture 254, which are exit signs. Array 203 and array 233 are parallel to each other with respect to the base unit 202 in FIG. 2.

Again, the base unit 202 provides a trickle charge to the array 233 of remote emergency light fixtures, beginning with remote emergency light fixture 234, to keep the energy storage devices, if any, inside of each remote emergency light fixture in the array 233 at or near a fully-charged state. As a result, when the emergency condition arises, the base unit 232 merely provides an activation signal to each remote emergency light fixture in the array.

The system 200 shown in FIG. 2 has several benefits over emergency light systems currently known in the art. For example, the system 200 allows for the capability to run long distance low voltage class 2 cable 250 between each remote emergency light fixture. The distance between remote emergency light fixtures may be increased because the class 2 cable 250 is only used to trickle charge the energy storage devices located within the remote emergency light fixtures, which causes the required current density of the class 2 cable 250 to be very low. Alternatively, a type of cable 250 (e.g., class 1) other than class 2 can be used to carry the trickle charge from the base unit 232 to the remote emergency light fixtures. In such a case, an existing system using class 1 cable 250 can be modified so that a trickle charge is delivered to the remote emergency light fixtures without changing out the existing class 1 cable 250 and/or running additional wiring to the remote emergency light fixtures.

In addition, the system 200 allows for a significant increase in the number of remote emergency light fixtures that may be electrically coupled to the base unit 202. Further, the system 200 allows for a drastic size reduction of the base unit 202 because, for example, the size of the energy source inside the base unit 202 is greatly reduced. In addition, the system 200 results in significantly increased safety due to the redundancy of distributed energy storage devices inside the remote emergency light fixtures.

Figure 3:
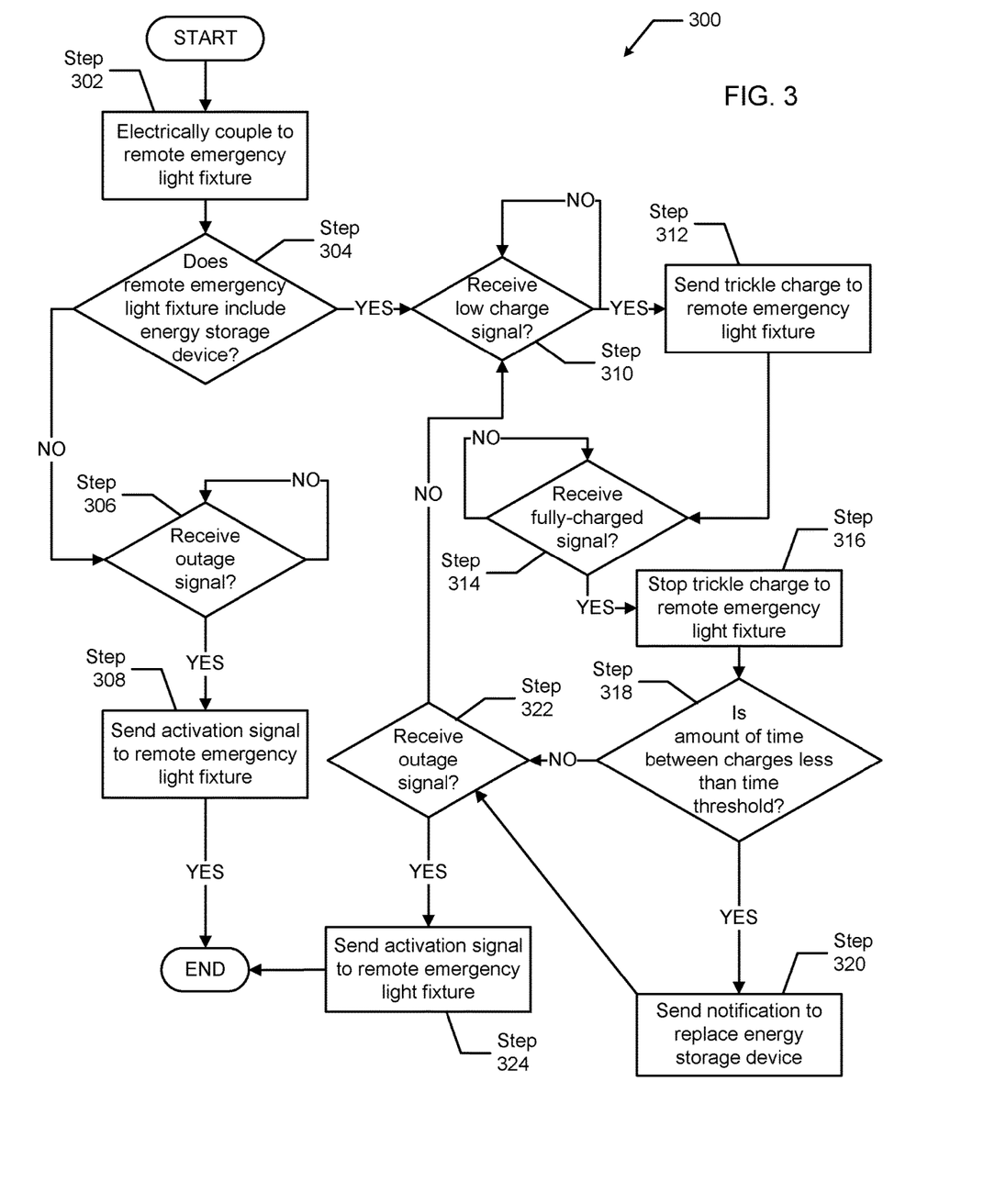
FIG. 3 is a flowchart presenting an exemplary method of providing power to remote emergency light fixtures in accordance with one or more exemplary embodiments.

FIG. 3 is a flowchart of a method 300 for providing power to remote emergency light fixtures in accordance with one or more exemplary embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the exemplary embodiments, one or more of the steps described below may be omitted, repeated, and/or performed in a different order. In addition, a person of ordinary skill in the art will appreciate that additional steps not shown in FIG. 3, may be included in performing this method. Accordingly, the specific arrangement of steps should not be construed as limiting the scope. In addition, a particular computing device, as described, for example, in FIG. 4 below, may be used to perform one or more of the steps for the method 300 described below.

Now referring to FIGS. 1 and 3, the exemplary method 300 begins at the START step and proceeds to Step 302, where an electrical coupling is made to a remote emergency light fixture (e.g., remote emergency light fixture 1 160). The electrical coupling may be made using the cable 110, which can comply with standards for a Class 1 and/or Class 2 circuit. For example, the cable 110, as well as the installation of the cable 110, may meet a standard for a Class 2 circuit set forth in Article 725 of the NEC. The other end of the electrical coupling may be to the base unit 102. The cable 110 may be coupled directly or indirectly to the remote emergency light fixture. When the cable 110 is coupled indirectly to the remote emergency light fixture, then a segment of the cable 110 may be electrically coupled between the base unit 102 and a junction box 170, while a different segment of the cable 110 may be electrically coupled between the remote emergency light fixture and the junction box 170.

In Step 304, a determination is made as to whether the remote emergency light fixture (e.g., remote emergency light fixture 1 160) includes an energy storage device (e.g., energy storage device 1 165). In certain exemplary embodiments, if the remote emergency light fixture does not include an energy storage device, then the base unit 102 includes a power source 106 that can deliver power to the remote emergency light fixture. If the remote emergency light fixture does not include an energy storage device, then the NO branch is followed to Step 306. If the remote emergency light fixture includes an energy storage device, then the YES branch is followed to Step 312.

In step 306, a determination is made as to whether an outage signal is received. The outage signal may be received by the base unit 102. The outage signal may be received from one or more external sources 180. The outage signal may be any type of signal or communication from an external source 180 indicating that an emergency condition exists. If an outage signal is not received, then the NO branch is followed back to Step 306 in a loop. If an outage signal is received, then the YES branch is followed to Step 308.

In Step 308, an activation signal is sent to the remote emergency light fixture (e.g., remote emergency light fixture 1 160). In certain exemplary embodiments, the activation signal includes the power needed to illuminate the lights of the remote emergency light fixture. The activation signal may be sent by the base unit 102. Specifically, the power of the activation signal may be sent by the power source 106 of the base unit 102. The activation signal may be sent using the cable 110. When the activation signal is sent to the remote emergency light fixture, the remote emergency light fixture activates, which illuminates the light of the remote emergency light fixture to provide emergency lighting. After Step 308, the process ends at the END step.

In Step 310, a determination is made as to whether a low charge signal has been received. In certain exemplary embodiments, a low charge signal corresponds to one of a number of energy levels of an energy storage device (e.g., energy storage device 1 165). Specifically, a low charge signal corresponds to a low charge level, which indicates that an energy level of the energy storage device has fallen below a lower energy level threshold. The low charge signal may be received when no power is being sent from the base unit 102 to the energy storage device.

The determination may be made by remote emergency light fixture manager 104, which compares the energy level of the energy storage device to a lower energy level threshold stored on the storage repository 130. The energy level of the energy storage device may be sent by the corresponding remote energy light fixture (e.g., remote emergency light fixture 1 160) to the base unit 102. The energy level may be sent by the corresponding remote energy light fixture to the base unit 102 on a fixed time interval, continuously, on demand from the base unit 102, or based on some other delivery schedule. When the energy level of the energy storage device is less than the lower energy threshold, then the signal of the energy level sent by the remote emergency light fixture is a low charge signal. If a low charge signal has not been received, then the NO branch is followed back to Step 310 in a loop. If a low charge signal has been received, then the YES branch is followed to Step 312.

In Step 312, a trickle charge is sent to the remote emergency light fixture. In certain exemplary embodiments, the trickle charge is sent by the base unit 102. The energy storage device (e.g., energy storage device 1 165) of the remote emergency light fixture may receive the trickle charge. When the energy storage device receives the trickle charge, the energy level of the energy storage device increases. Put another way, the trickle charge charges the energy storage device. The trickle charge may be a form of power sent by the base unit 102.

In Step 314, a determination is made as to whether a fully-charged signal has been received. In certain exemplary embodiments, a fully-charged signal corresponds to one of a number of energy levels of an energy storage device (e.g., energy storage device 1 165). Specifically, a fully-charged signal corresponds to a high charge level, which indicates that the energy level of the energy storage device exceeds an upper energy level threshold. The fully-charged signal may be received when power (e.g., the trickle charge) is being sent from the base unit 102 to the energy storage device.

The determination may be made by remote emergency light fixture manager 104, which compares the energy level of the energy storage device to the upper energy level threshold stored on the storage repository 130. When the energy level of the energy storage device exceeds the upper energy threshold, then the signal of the energy level sent by the remote emergency light fixture is a fully-charged signal. If a fully-charged signal has not been received, then the NO branch is followed back to Step 314 in a loop. If a fully-charged signal has been received, then the YES branch is followed to Step 316.

In Step 316, the trickle charge to the remote emergency light fixture is stopped (terminated). In certain exemplary embodiments, the trickle charge is stopped by the base unit 102. The trickle charge may be stopped because the energy storage device is fully-charged or nearly fully-charged. By stopping the trickle charge to the energy storage device when the energy storage device is fully-charged or nearly fully-charged, the energy storage device may have a longer life.

In Step 318, a determination is made as to whether an amount of time between charges is less than a time threshold. The amount of time between charges may be determined in one of a number of ways. For example, the amount of time between charges may be measured from receiving a previous fully-charged signal to the current fully-charged signal. As another example, the amount of time between charges may be measured from receiving a previous low charge signal to the current low charge signal. The amount of time may be measured by the timer 108 of the base unit 102. The time threshold may be retrieved from the thresholds 134 in the storage repository 130. The determination may be made by the remote emergency light fixture manager 104 of the base unit 102. If the amount of time is less than the time threshold, then the YES branch is followed to Step 320. If the amount of time is not less than the time threshold, then the NO branch is followed to Step 322.

In Step 320, a notification to replace the energy storage device is sent. The notification may be sent by the remote emergency light fixture manager 104 of the base unit 102. The notification may be sent to a user. The notification may be a sound (e.g., a siren), text (e.g., an email, a text message, a pop-up window), visual (e.g., a flashing light), and/or any other suitable format to communicate that the energy storage device needs to be replaced. There may be a number of notifications, each corresponding to a number of time thresholds. For example, there may be time thresholds of 5 hours and 10 hours. If the amount of time determined in Step 316 is 8 hours, then the notification may be a flashing yellow light on a control panel stating that the energy storage device should be replaced. If, on the other hand, the amount of time is 3 hours, then the notification may be a siren, a flashing red light, and a text message to a user with a subject of "EMERGENCY."

In Step 322, a determination is made as to whether an outage signal has been received. As in Step 306, the outage signal may be received from one or more external sources 180. The outage signal may be any type of signal or communication from an external source 180 indicating that an emergency condition exists. If an outage signal is not received, then the NO branch is followed back to Step 310. If an outage signal is received, then the YES branch is followed to Step 324.

In Step 324, an activation signal is sent to the remote emergency light fixture (e.g., remote emergency light fixture 1 160). In certain exemplary embodiments, the activation signal instructs the remote emergency light fixture to illuminate the lights of the remote emergency light fixture. The activation signal may be sent by the base unit 102. Specifically, the activation signal may be sent by the power source 106 and/or remote emergency light fixture manager 104 of the base unit 102. The activation signal may be sent using the cable 110. When the activation signal is sent to the remote emergency light fixture, the remote emergency light fixture activates, which illuminates the light of the remote emergency light fixture to provide emergency lighting. After Step 324, the process ends at the END step.

Figure 4:
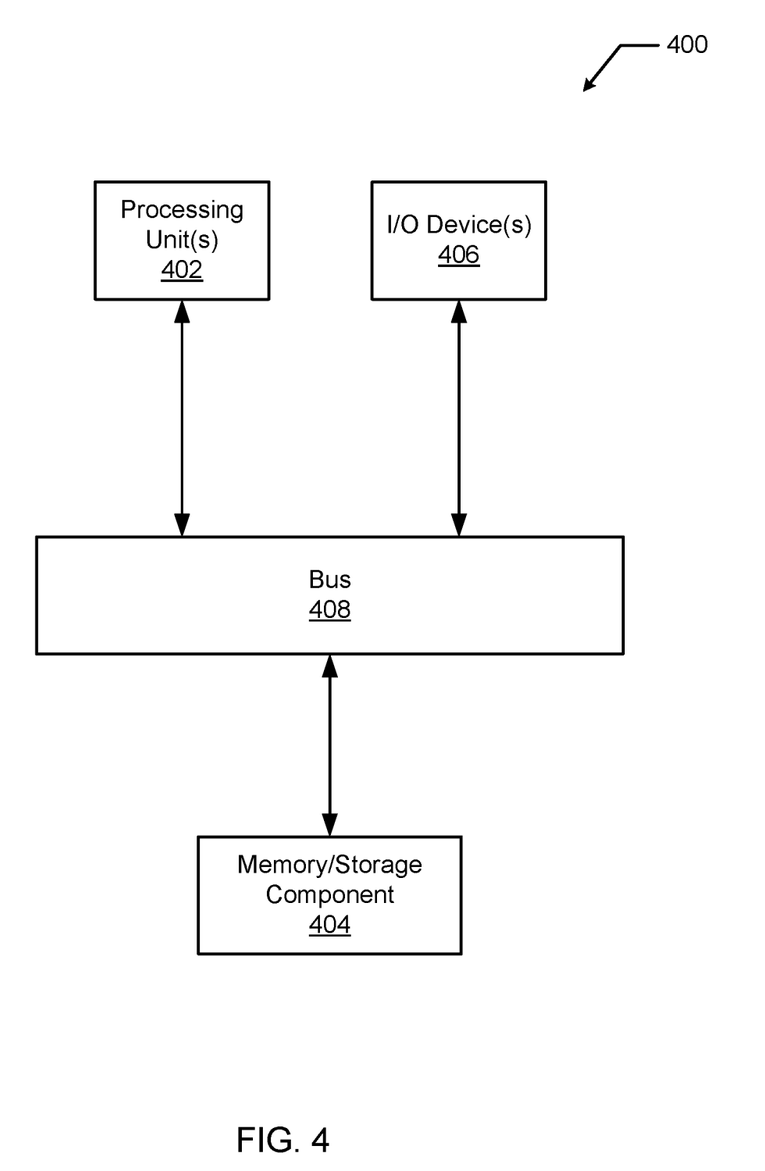
FIG. 4 shows a computer system for providing power to remote emergency light fixtures in accordance with one or more exemplary embodiments.

FIG. 4 illustrates one embodiment of a computing device 400 capable of implementing one or more of the various techniques described herein, and which may be representative, in whole or in part, of the elements described herein. Computing device 400 is only one example of a computing device and is not intended to suggest any limitation as to scope of use or functionality of the computing device and/or its possible architectures. Neither should computing device 400 be interpreted as having any dependency or requirement relating to any one or combination of components illustrated in the example computing device 400.

Computing device 400 includes one or more processors or processing units 402, one or more memory/storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Memory/storage component 404 may include volatile media (such as random access memory (RAM)) and/or nonvolatile media (such as read only memory (ROM), flash memory, optical disks, magnetic disks, and so forth). Memory/storage component 404 can include fixed media (e.g., RAM, ROM, a fixed hard drive, etc.) as well as removable media (e.g., a Flash memory drive, a removable hard drive, an optical disk, and so forth).

One or more I/O devices 406 allow a customer, utility, or other user to enter commands and information to computing device 400, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 400 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 400 includes at least the minimal processing, input, and/or output means necessary to practice one or more embodiments.

Further, those skilled in the art will appreciate that one or more elements of the aforementioned computer device 400 may be located at a remote location and connected to the other elements over a network. Further, one or more exemplary embodiments may be implemented on a distributed system having a plurality of nodes, where each portion of the implementation (e.g., base unit 102, external source 180) may be located on a different node within the distributed system. In one or more embodiments, the node corresponds to a computer system. Alternatively, the node may correspond to a processor with associated physical memory. The node may alternatively correspond to a processor with shared memory and/or resources.

The following description (in conjunction with FIGS. 1 through 4) describes examples in accordance with one or more exemplary embodiments. The examples are for explanatory purposes only and are not intended to limit the scope. Terminology used in FIGS. 1-4 may be used in the examples without further reference to those figures.

Example 1

Referring to FIGS. 1-5, consider the following example, using the remote emergency light system 100 (of FIG. 1), described above. In this example, none of the remote emergency light fixtures (e.g., remote emergency light fixture 1 160, remote emergency light fixture N 164) have an energy storage device. Initially, there is normal operation 502 with the external sources 180. As a result, no signal (or, in the alternative, a normal operation signal) is sent from the external sources 180 to the base unit 102. In addition, all of the remote emergency light fixtures (e.g., remote emergency light fixture 1 160, remote emergency light fixture N 164) are inactive.

Figure 5:
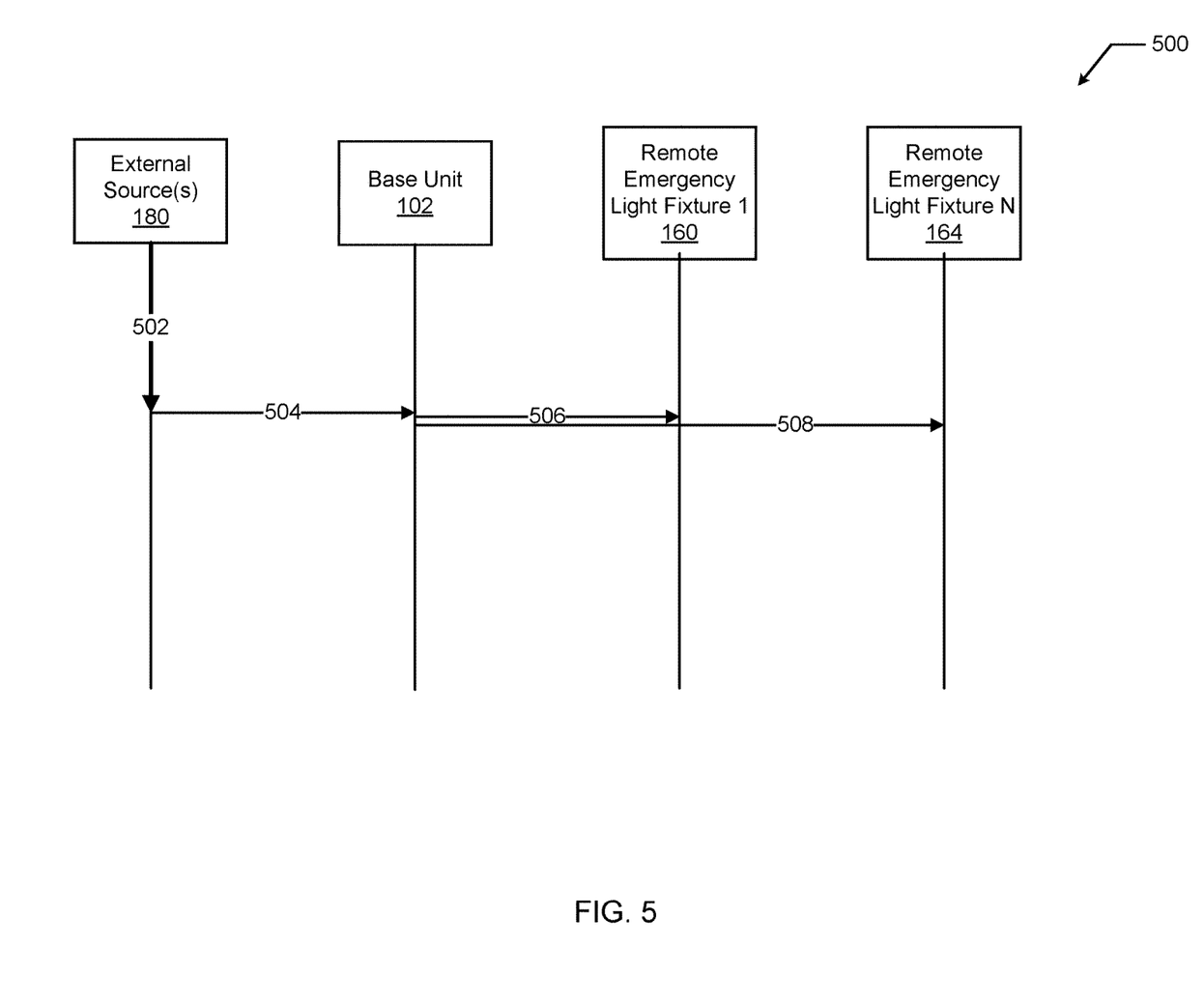
FIG. 5 is a system diagram showing the operation of an exemplary remote emergency light system in accordance with one or more exemplary embodiments.

At some point later in time, there is an emergency condition that arises so that one or more of the external sources 180 sends an outage signal 504 to the base unit 102. The external source 180 may send the outage signal 504 to the base unit 102 using a cable 110, some other cable, and/or one or more wireless technologies. Upon receiving the outage signal 504, the base unit 102 sends power 506 through the cables 110 to each of the remote emergency light fixtures (e.g., remote emergency light fixture 1 160, remote emergency light fixture N 164). Upon receiving the power 506 from the base unit 102 through the cables 110, each of the remote emergency light fixtures activate, causing the light coupled to each remote emergency light fixture to illuminate.

Example 2

Referring to FIGS. 1-4 and 6, consider the following example, using the remote emergency light system 100 (of FIG. 1), described above. In this example, each of the remote emergency light fixtures (e.g., remote emergency light fixture 1 160, remote emergency light fixture N 164) electrically coupled to the base unit 102 have an energy storage device 165-169. Initially, there is normal operation 602 with the external sources 180. As a result, no signal (or, in the alternative, a normal operation signal) is sent from the external sources 180 to the base unit 102. In addition, all of the remote emergency light fixtures 160-164 are inactive.

Figure 6:
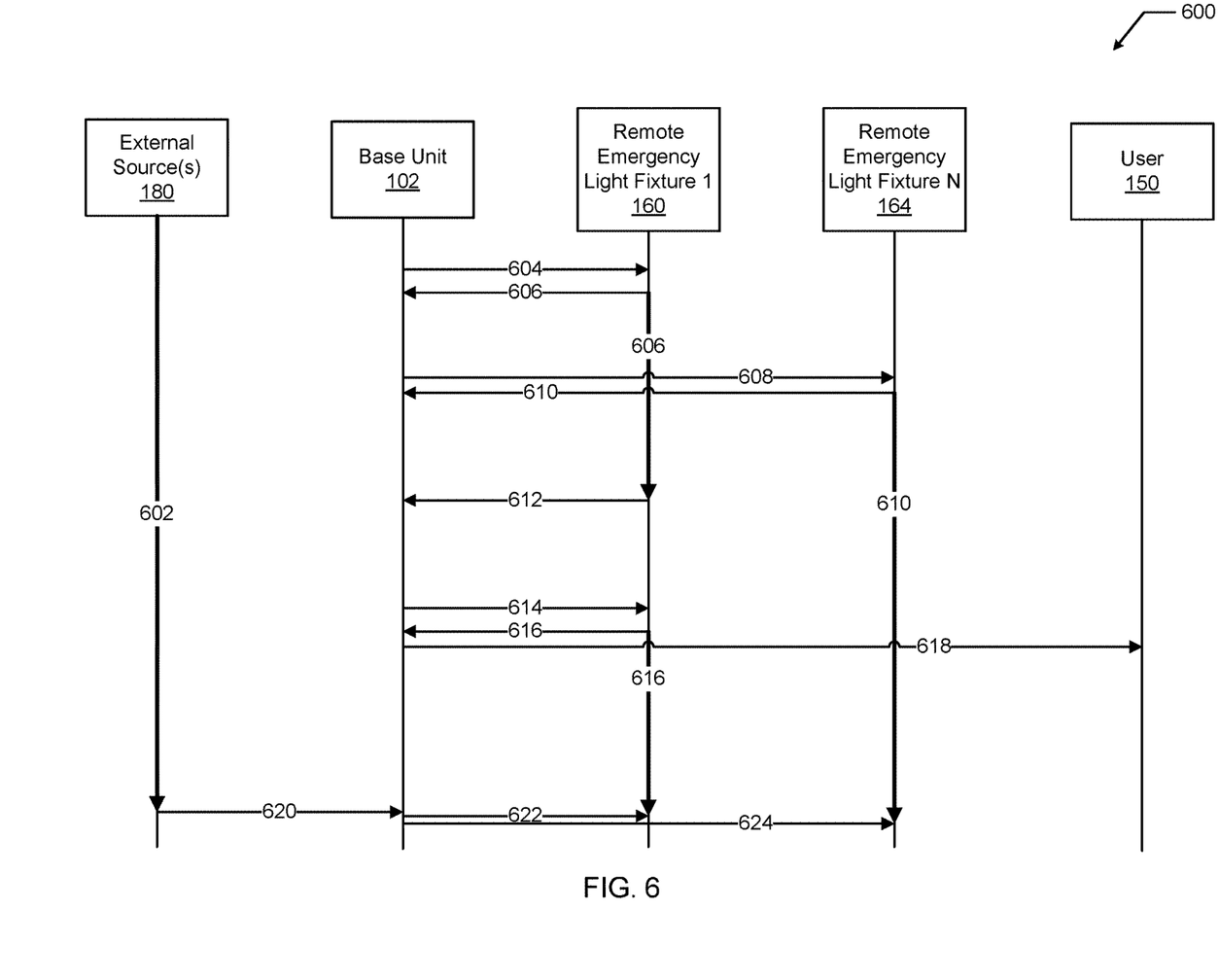
FIG. 6 is a system diagram showing the operation of another exemplary remote emergency light system in accordance with one or more exemplary embodiments.

Subsequently, the base unit 102 receives a low charge signal 604 from the remote emergency light fixture 1 160. Specifically, the base unit 102 receives a signal (in this case, the low charge signal 604) from the remote emergency light fixture 1 160, where the signal corresponds to the energy level of the energy storage device 1 165 of the remote emergency light fixture 1 160. The low charge signal 604 may be sent using the cable 110. The signal, once received by the base unit 102, is compared to a lower energy level threshold. In this case, the energy level that corresponds to the signal is less than the lower energy level threshold, and so the signal is a low charge signal 604. The low charge signal 604 may be sent by the remote emergency light fixture 1 160 automatically or in response to a request (not shown) from the base unit 102.

Upon receiving the low charge signal 604 and determining that the energy level of the energy storage device 1 165 is less than the lower energy level threshold (stored in the storage repository 130 of the base unit 102), the base unit 102 sends power (specifically, a trickle charge 606) to the energy storage device 1 165 of the remote emergency light fixture 1 160 using the cable 110. When the trickle charge 606 is sent using the cable 110, the timer 108 of the base unit 102 starts tracking time. During this time, normal operation 602 continues with the external sources 180.

After 2 hours, the base unit 102 continues to send the trickle charge 606 to the energy storage device 1 165 of the remote emergency light fixture 1 160 using the cable 110. In addition, the base unit 102 receives a low charge signal 608 from the remote emergency light fixture N 164. Specifically, the base unit 102 receives a signal (in this case, the low charge signal 608) from the remote emergency light fixture N 169, where the signal corresponds to the energy level of the energy storage device N 166 of the remote emergency light fixture N 164. The low charge signal 608 may be sent using the cable 110. The signal, once received by the base unit 102, is compared to the lower energy level threshold. In this case, the energy level that corresponds to the signal is less than the lower energy level threshold, and so the signal is a low charge signal 608. The low charge signal 608 may be sent by the remote emergency light fixture N 164 automatically or in response to a request (not shown) from the base unit 102.

Upon receiving the low charge signal 608 and determining that the energy level of the energy storage device N 166 is less than the lower energy level threshold (stored in the storage repository 130 of the base unit 102), the base unit 102 sends power (specifically, a trickle charge 610) to the energy storage device N 166 of the remote emergency light fixture N 164 using the cable 110. When the trickle charge 610 is sent, the timer 108 of the base unit 102 starts tracking time. In the meantime, the timer 108 also continues to track the time since the base unit 102 sent the trickle charge 606 to the energy storage device 1 165 of the remote emergency light fixture 1 160 using the cable 110. During this time, normal operation 602 continues with the external sources 180.

One hour later, the base unit 102 continues to send the trickle charge 610 to the energy storage device N 169 of the remote emergency light fixture N 164 using the cable 110. In addition, the base unit 102 receives a fully-charged signal 612 from the remote emergency light fixture 1 160. Specifically, the base unit 102 receives a signal (in this case, the fully-charged signal 612) from the remote emergency light fixture 1 160, where the signal corresponds to the energy level of the energy storage device 1 165 of the remote emergency light fixture 1 160. The fully-charged signal 612 may be sent using the cable 110. The signal, once received by the base unit 102, is compared to an upper energy level threshold. In this case, the energy level that corresponds to the signal exceeds the upper energy level threshold, and so the signal is a fully-charged signal 612. The fully-charged signal 612 may be sent by the remote emergency light fixture 1 160 automatically or in response to a request (not shown) from the base unit 102.

Upon receiving the fully-charged signal 612 and determining that the energy level of the energy storage device 1 165 exceeds the upper energy level threshold (stored in the storage repository 130 of the base unit 102), the base unit 102 stops sending power (specifically, the trickle charge 606) to the energy storage device 1 165 of the remote emergency light fixture 1 160 using the cable 110. When the trickle charge 606 is stopped, the timer 108 of the base unit 102 continues to track time since a) the base unit 102 sent the trickle charge 606 to the energy storage device 1 165 of the remote emergency light fixture 1 160 using the cable 110 and b) the base unit 102 sent the trickle charge 610 to the energy storage device N 166 of the remote emergency light fixture N 169 using the cable 110. During this time, normal operation 602 continues with the external sources 180.

One hour later, the base unit 102 receives another low charge signal 614 from the remote emergency light fixture 1 160. Specifically, the base unit 102 receives a signal (in this case, the low charge signal 614) from the remote emergency light fixture 1 160, where the signal corresponds to the energy level of the energy storage device 1 165 of the remote emergency light fixture 1 160. The low charge signal 614 may be sent using the cable 110. The signal, once received by the base unit 102, is compared to the lower energy level threshold. In this case, the energy level that corresponds to the signal is less than the lower energy level threshold, and so the signal is a low charge signal 614.

Upon receiving the low charge signal 614 and determining that the energy level of the energy storage device 1 165 is less than the lower energy level threshold (stored in the storage repository 130 of the base unit 102), the base unit 102 sends power (specifically, a trickle charge 616) to the energy storage device 1 165 of the remote emergency light fixture 1 160. When the trickle charge 616 is sent, the timer 108 simultaneously a) stops tracking and records (for example, in the time records 132 of the storage repository 130) the time since the base unit 102 sent the trickle charge 606 to the energy storage device 1 165 of the remote emergency light fixture 1 160 using the cable 110, and b) starts tracking the time since the base unit 102 sent the trickle charge 616 to the energy storage device 1 165 of the remote emergency light fixture 1 160 using the cable 110. During this time, normal operation 602 continues with the external sources 180.

Once the time between charges (between the start of trickle charge 606 and the start of the trickle charge 616) for the energy storage device 1 165 of the remote emergency light fixture 1 160 has been recorded, the remote emergency light fixture manager 104 compares this time to one or more time thresholds. In this example, the amount of time between charges is 4 hours. Each of the time thresholds may be stored in the thresholds 134 of the storage repository 130.

In this example, there are two time thresholds: one for 12 hours, and one for 5 hours. The time threshold of 12 hours only triggers a yellow flashing indicator on a control panel indicating that the energy storage device 1 165 needs to be changed, while the time threshold of 5 hours triggers a siren, a flashing light at the base unit 102, and a red flashing light on the control panel indicating that the energy storage device 1 165 needs to be changed. Here, because the time between charges (4 hours) is less than both time thresholds, the alarms associated with the time threshold of 5 hours are triggered by the remote emergency light fixture manager 104 when the remote emergency light fixture manager 104 sends a notification to the user 150 in the form of the siren, the flashing light at the base unit 102, and the flashing red on the control panel. The remote emergency light fixture manager 104 may send the notification using the cable 110, some other cable, and/or one or more wireless technologies. During this time, normal operation 602 continues with the external sources 180. In addition, the base unit 102 continues to send the trickle charge 610 to the energy storage device N 166 of the remote emergency light fixture N 164, and the timer 180 continues to track the time since the base unit 102 sent the trickle charge 610 to the energy storage device N 166 of the remote emergency light fixture N 164.

One hour later, the base unit 102 continues to send the trickle charge 610 to the energy storage device N 166 of the remote emergency light fixture N 164 using the cable 110. The base unit 102 also continues to send the trickle charge 616 to the energy storage device 1 165 of the remote emergency light fixture 1 160 using the cable 110. In addition, there is an emergency condition that arises so that one or more of the external sources 180 sends an outage signal 620 to the base unit 102. The external source 180 may send the outage signal 620 to the base unit 102 using the cable 110, some other cable, and/or one or more wireless technologies.

Upon receiving the outage signal 620, the base unit 102 sends power in the form of activation signals (including activation signal 622 and activation signal 624) through the cables 110 to each of the remote emergency light fixtures (including remote emergency light fixture 1 160 and remote emergency light fixture N 164). Upon receiving the activation signals from the base unit 102 through the cables 110, each of the remote emergency light fixtures activate, causing the light coupled to each remote emergency light fixture to illuminate.

Exemplary embodiments described herein are directed to remote emergency light systems. Using exemplary embodiments, a wide array of functionality (e.g., controlling, charging, powering) with regard to one or more remote emergency light fixtures is achieved in greater number and/or over a larger area. Exemplary embodiments have smaller profiles, higher reliability, and increased safety functionality.

Certain exemplary embodiments offer several benefits over emergency light systems currently known in the art. For example, certain exemplary embodiments offer the ability to place one or more remote emergency light fixtures a relatively long distance from the base unit. The distance between remote emergency light fixtures may be increased because the class 2 cable is used. When the power delivered to the remote emergency light fixtures is a trickle charge, the remote emergency light fixtures may be placed an even greater distance from the base unit. In such a case, the energy storage devices located within the remote emergency light fixtures require only a relatively low (less than 300 mA) current density, which allows for the use of the class 2 cable.

In addition, certain exemplary embodiments allow for a significant increase in the number of remote emergency light fixtures that may be electrically coupled to the base unit. Further, certain exemplary embodiments allow for a drastic size reduction of the base unit because, for example, the size of the energy source inside the base unit is greatly reduced. Specifically, when energy storage devices are included in the remote emergency light fixtures, the power source within the base unit is significantly smaller. In addition, using certain exemplary embodiments results in significantly increased safety during an emergency condition due, in part, to the redundancy of distributed energy storage devices inside the remote emergency light fixtures.

Further, using power in the form of a trickle charge, where the trickle charge is cycled (i.e., stopped when the energy storage device is fully charged and resumed when the energy level in the energy storage device reaches a lower energy level threshold) attributes to a longer life and increased reliability of the remote energy light fixtures and the base unit. In addition, using certain exemplary embodiments to monitor when a energy storage device is beginning to fail and notify a user of such an event increases the safety and reliability of a remote emergency light system.

In addition, using certain exemplary embodiments allows for reduced cost to install and maintain a remote emergency light system. For example, because the wiring used in certain exemplary embodiments is class 2 cable, material may be saved by not requiring, for example, conduit and class 1 wiring. Further, labor costs may be saved by not requiring a licensed electrician to perform the installation of the class 2 cable.

Although embodiments described herein are made with reference to exemplary embodiments, it should be appreciated by those skilled in the art that various modifications are well within the scope and spirit of this disclosure. Those skilled in the art will appreciate that the exemplary embodiments described herein are not limited to any specifically discussed application and that the embodiments described herein are illustrative and not restrictive. From the description of the exemplary embodiments, equivalents of the elements shown therein will suggest themselves to those skilled in the art, and ways of constructing other embodiments using the present disclosure will suggest themselves to practitioners of the art. Therefore, the scope of the present invention is not limited herein.

We claim:

1. A system comprising:
   a base unit configured to be electrically coupled to a direct current (DC) power source, wherein the base unit is configured to receive power from the DC power source and send output power, wherein the base unit is further configured to generate a plurality of communication signals;
   a plurality of series-connected devices comprising a first device and a second device, wherein the plurality of series-connected devices is electrically coupled in series to one another and to the base unit, wherein the first device operates using, at least in part, a first energy storage device of the first device, wherein the first device and the second device receive the output power from the base unit; and
   a first class 2 cable having a first end electrically coupled to the base unit and a second end electrically coupled to the first device; and
   a second class 2 cable having a first end electrically coupled to the first device and a second end electrically coupled to the second device,
   wherein the first class 2 cable delivers the output power and the plurality of communication signals from the base unit to the first device, wherein the second class 2 cable delivers the output power and the plurality of communication signals to the second device, wherein the first class 2 cable and the second class 2 cable are capable of being installed without an electrical professional, and
   wherein the first device and the second device operate based on the plurality of communication signals.

2. The system of claim 1, further comprising:
   a junction box disposed electrically between the base unit and the first device, wherein the first class 2 cable has a first end coupled to the base unit and a second end coupled to the junction box; and
   a third class 2 cable having a first end coupled to the junction box and a second distal end coupled to the first device.

3. The system of claim 1, further comprising a third device electrically coupled to the base unit in parallel with the plurality of series-connected devices, wherein the third device is coupled to the base unit using a third class 2 cable.

4. The system of claim 3, further comprising a fourth device electrically coupled to the third device using a fourth class 2 cable, wherein the base unit, the third device, and the fourth device are electrically coupled to each other in series.

5. The system of claim 4, wherein the third device and the fourth device are part of an additional plurality of series connected devices that are electrically in parallel with the plurality of series-connected devices.

6. The system of claim 3, wherein the third device comprises a second energy storage device.

7. The system of claim 1, wherein the output power supplied by the base unit to the first energy storage device of the first device through the class 2 cable comprises a trickle charge.

8. The system of claim 7, wherein the base unit supplies the trickle charge to the first device during a normal condition.

9. The system of claim 8, wherein the DC power source provides the power to the base unit during the normal condition.

10. The system of claim 1, wherein the first energy storage device of the first device is removable and replaceable.

11. The system of claim 1, wherein the first energy storage device is a battery.

12. The system of claim 1, further comprising:
a hardware processor, wherein the base unit executes software on the hardware processor and is further configured to:
determine that an energy level of the first energy storage device is less than a lower energy level threshold; and
provide, in response to determining that the energy level is less than the lower energy level threshold, a trickle charge to the first energy storage device.

13. The system of claim 1, wherein the first device comprises an emergency light.

14. The system of claim 1, wherein the first device is an exit sign.

15. The system of claim 1, wherein the first device is an egress light.

16. The system of claim 1, wherein the first class 2 cable is an Ethernet cable.

17. The system of claim 1, wherein the DC power source is a battery.

18. The system of claim 1, wherein the second device comprises a second energy storage device.

19. A device among a plurality of series-connected devices, wherein the device comprises:
an energy storage device;
a first cable receiver configured to receive a first class 2 cable, wherein the first class 2 cable is electrically coupled to a base unit, wherein the base unit is electrically coupled to a DC power source, wherein the base unit generates a plurality of communication signals and generates output power using DC power provided by the DC power source, wherein the output power and the plurality of communication signals are delivered from the base unit to the first cable receiver through an upstream device; and
a second cable receiver configured to receive a second class 2 cable, wherein the second class 2 cable is electrically coupled to another device of the plurality of series-connected devices,
wherein the output power received at the first cable receiver is altered to provide a charge signal to the energy storage device, wherein the charge signal is generated from the output power,
wherein the charge signal is further sent along the second class 2 cable from the second cable receiver to the another device,
wherein the plurality of communication signals sent by the base unit is received at the first cable receiver using the first class 2 cable and provides instructions for operating the energy storage device, and
wherein the plurality of communication signals is further sent along the second class 2 cable from the second cable receiver to the another device, wherein the plurality of communication signals further provides instructions for operating the another device.

20. A device among a plurality of series-connected devices, wherein the device comprises:
a first cable receiver configured to receive a first class 2 cable, wherein the first class 2 cable is electrically coupled to an upstream device of the plurality of series-connected devices, wherein the upstream device comprises an energy storage device, wherein the upstream device is electrically coupled to a base unit, wherein the base unit is electrically coupled to a DC power source, wherein the base unit generates a plurality of communication signals and generates output power using DC power provided by the DC power source, wherein the output power and the plurality of communication signals are delivered from the base unit to the first cable receiver through the upstream device,
wherein the output power received at the first cable receiver is altered to provide a charge signal to the energy storage device, wherein the charge signal is generated from the output power,
wherein the charge signal is further sent along a second class 2 cable from a second cable receiver to a downstream device of the plurality of series-connected devices,
wherein the plurality of communication signals sent by the base unit is received at the first cable receiver using the first class 2 cable, and
wherein the plurality of communication signals is further sent along the second class 2 cable from the second cable receiver to the downstream device, wherein the plurality of communication signals further provides instructions for operating the downstream device.

* * * * *